United States Patent [19]

Insalaco

[11] 3,961,443
[45] June 8, 1976

[54] COVER FOR NURSERY POTS PROVIDING IMPROVED PROTECTION, SUPPORT AND FEEDING

[76] Inventor: Charles J. Insalaco, Pigeon Swamp Road, South Windham, Conn. 06266

[22] Filed: May 5, 1975

[21] Appl. No.: 574,650

[52] U.S. Cl. .................... 47/32; 47/34 R; 47/34.11; 47/37; 206/423; 220/306; 220/319
[51] Int. Cl.² ............................. A01G 13/00
[58] Field of Search ............... 215/48, 40, 47, 13, 215/231; 220/60, 306, 319; 47/32, 34, 37, 25, 34.13, 34.11; 206/423

[56] References Cited
UNITED STATES PATENTS

| | | | |
|---|---|---|---|
| 2,017,308 | 10/1935 | Elmer | 47/32 X |
| 2,797,777 | 7/1957 | Cookson | 220/306 X |
| 2,867,946 | 1/1959 | Kobs | 47/34.13 X |
| 2,901,098 | 8/1959 | Tupper | 220/306 X |
| 3,147,569 | 9/1964 | Murguia | 47/37 |
| 3,287,851 | 11/1966 | Cramer | 47/25 |
| 3,474,930 | 10/1969 | Lerner | 220/319 X |
| 3,580,409 | 5/1971 | Soboleski | 215/231 |
| 3,618,260 | 4/1970 | Convey, Jr. et al. | 47/32 |
| 3,785,088 | 1/1974 | Guarriello | 47/34 |

*Primary Examiner*—Edgar S. Burr
*Assistant Examiner*—James R. Feyrer
*Attorney, Agent, or Firm*—Donald F. Bradley

[57] ABSTRACT

A cover for nursery and flower pots is constructed from a thin flexible plastic material having a plurality of holes therein through which water and nutrients may be supplied to the stock. A circumferential lip about the outside perimeter of the cover is adapted to fit over the top of a pot and secure the cover thereto. The cover is formed with a plurality of annular steps which are graduated in depth toward the open center. The cover is in one piece with a single radially extending slit or separation to permit the cover to be opened for placement on a pot containing growing stock. A flexible tab which secures to a knob on the outside circumference of the cover serves to lock the cover in place.

6 Claims, 6 Drawing Figures

FIG. 4
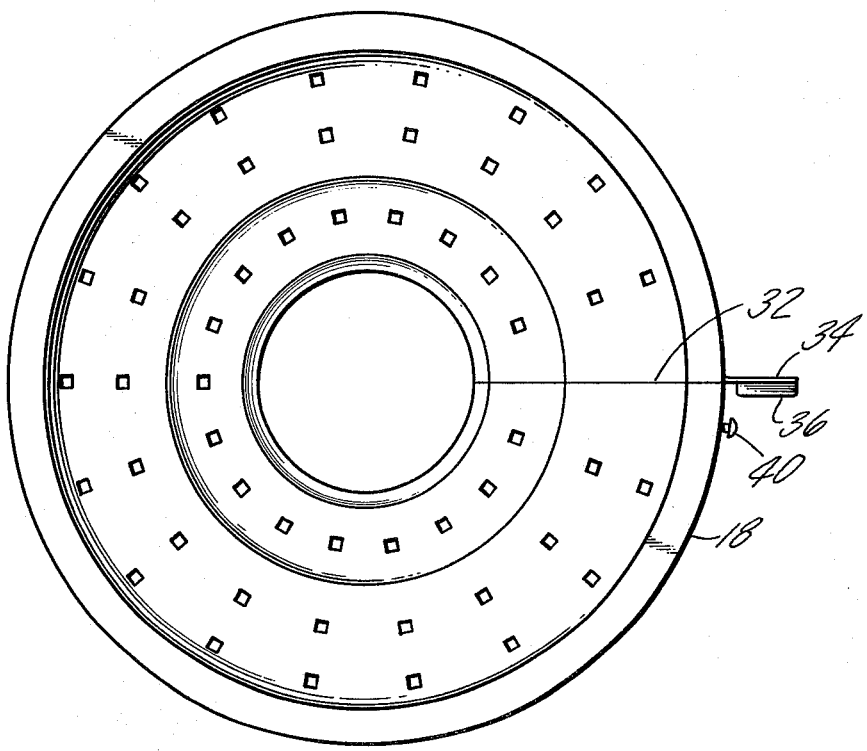
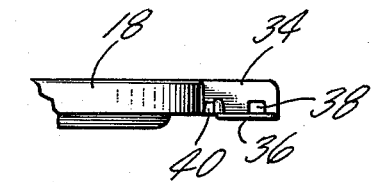
FIG. 5

COVER FOR NURSERY POTS PROVIDING IMPROVED PROTECTION, SUPPORT AND FEEDING

BACKGROUND OF THE INVENTION

1. Field of the Invention

This invention relates to a cover for a nursery or flower pot which serves to protect and support the stock and which also allows improved feeding and watering of the stock. The cover is formed in one piece from a flexible plastic, and is adapted to fit securely to the upper rim of the pot.

2. Description of the Prior Art

One of the limiting factors in growing and marketing nursery stock is the expense and inconvenience involved in balling, shipping and displaying the stock. For the typical bare root shrub or plant, the nurseryman must ball the plant in peat or similar material, and wrap the roots with a material such as burlap which will protect the roots and prevent deterioration of the root zone. Since the material in which the plant is balled is typically an artificial soil mix which dries out quickly, thus causing the plant to deteriorate or die, a plastic wrap such as polywrap is conventionally used over the balled and burlapped plant to permit the retention of moisture. However, this prevents normal watering of the plant, and the plant roots are denied sufficient oxygen to grow normally.

A similar problem exists where roses and small deciduous shrubs are wrapped in kraft wrap. Plants packaged in this manner have a very short shelf life, thereby causing losses to the retailer or consumer.

The balling and wrapping process itself requires considerable expense in machinery and/or labor in addition to the materials used.

Once the plant is properly prepared and packaged, it must then be shipped to a retailer. Often because of abusive handling by unskilled labor, or because of damage which occurs in shipping due to falling, improper stacking or simply accidental injury, numerous plants fail to arrive at the retailer's establishment in good condition.

Once in the hands of the retailer, the plants must be displayed to the customers. Because prepackaged plants cannot easily be watered or otherwise maintained, many plants deteriorate or die if they are not sold and replanted properly in a short time. Damage often occurs due to deterioration of the wrapping material. Furthermore, today's packaging techniques are not conducive to permitting the retailer to display the plants in an attractive manner to the consumer.

When a plant is purchased by the consumer, it must be replanted properly within a reasonable period of time in order for all except the hardiest of plants to survive. Even under the best conditions the plant suffers shock when transplanted by the consumer.

The present invention overcomes the disadvantages inherent in the present system of packaging, shipping and marketing of plants, and permits the growing, shipping, displaying and transplanting of nursery plants and stock with minimum damage and shock, as well as permitting maintenance of the plants and providing a more attractive display of the merchandise.

A prime purpose of the present invention is an attractive and practical packaging system for bare root shrubs, roses, trees and other field grown stock which will reduce costs and assure the survival of the stock. The packaging system, consisting of a plastic pot and a novel plastic pot cover adapted to fit over the pot, permits convenient packaging, feeding and display of the stock without the disadvantages of the prior art. The new system places small nursery stock growers on the same footing with larger ones since expensive balling machines would not be necessary.

The pot cover of the present invention is adapted to fit securely on the top of a flower or nursery pot and cooperate therewith to form a relatively rigid enclosure for the stock contained therein. The cover is preferably formed from low density polyethylene plastic of sufficient thickness to provide rigidity, but flexible enough to allow for normal handling without cracking or splitting. The cover contains a plurality of holes which permit watering and feeding of the stock.

When used in conjunction with the nursery pot described and claimed in copending application Ser. No. 373,451 filed June 25, 1973 and entitled "Color Coded Nursery Pot Having Improved Drainage and Resistance to Soil Compaction", now U.S. Pat. No. 3,896,587, or with a similar nursery pot, the combined pot and cover form a package which provides numerous advantageous features over the prior art. The nursery stock may be field grown and packaged bare root, thereby saving the expense of balling and burlapping, and the covered package can be shipped immediately and displayed in the same pot until ready for sale. Because of the unique construction of the pot and cover, feeding and watering of the stock is easily and conveniently accomplished. The stock may be shipped and displayed in the original container which, with its cover, provides sufficient rigidity to prevent damage during shipment and/or display. The plastic material from which the pot and cover are constructed allow for the use of attractive colors which, together with the pleasing design of the pot and cover, form an attractive display for the merchandise. Due to the low cost of the plastic pot and cover, and the fact that no balling machinery, materials or labor are required, the cost of the merchandise is significantly reduced, and small growers can compete with larger operations such as in the rose industry. Once on display, feeding and maintenance of the stock can be accomplished easily by the retailer, thereby reducing loss at the retail level. The customer upon purchasing the stock can transport it in the same pot without risk of damage. Transplanting into the ground can be accomplished without severe shock to the stock since removing the stock from the covered pot without disturbing the roots is easily accomplished. Should transplanting be delayed, or should it be desired to display the stock without transplanting, the pot and cover form an attractive and convenient container, and feeding is easily accomplished by the customer.

The pot and cover combination also permit the growing of vegetables from seed or seedling by those without the necessary yard space, as long as sufficient sunlight is available such as on a porch or ledge, or even indoors under artificial light.

SUMMARY OF THE INVENTION

In accordance with a preferred embodiment of the present invention, a cover for a nursery pot is constructed from thin, flexible plastic. The cover is circular and contains an open center for completely encircling the stock. The outside circumference of the cover forms a lip which is adapted to fit securely over the top of a nursery pot to form a semi-rigid container for the stock. The cover is formed to have a plurality of annular steps which direct water toward the center of the cover which is lower than the outer circumference. The cover contains a plurality of small holes to enhance watering and feeding therethrough. The cover is of one piece with a single radially extending slit or separation which permits the cover to be opened so it can be attached to removed from a pot even when stock is contained in the pot. A locking assembly comprising a flexible tab and a locking knob located on the outer periphery of the cover prevents the cover from spreading apart.

The cover when attached to a nursery pot such as described in application Ser. No. 373,451, now U.S. Pat. No. 3,896,587, forms a unique container assembly for growing, shipping and displaying nursery stock.

BRIEF DESCRIPTION OF THE DRAWINGS

FIG. 4 is a top view of the pot cover including a locking assembly.

FIG. 5 is a partial front view of the pot cover of FIG. 4 showing the details of the locking assembly.

DESCRIPTION OF THE PREFERRED EMBODIMENT

The construction of the pot cover is shown in detail in FIGS. 1 through 5. The cover is preferably composed of a plastic material such as polyethylene which may be molded from dies and which may easily be formed in different colors. A thickness of about 0.055 inch is representative, and provides the required strength and rigidity while at the same time permitting a flexibility so that the cover may be deformed or bent during use or in shipment without adverse effects.

Figure 1:
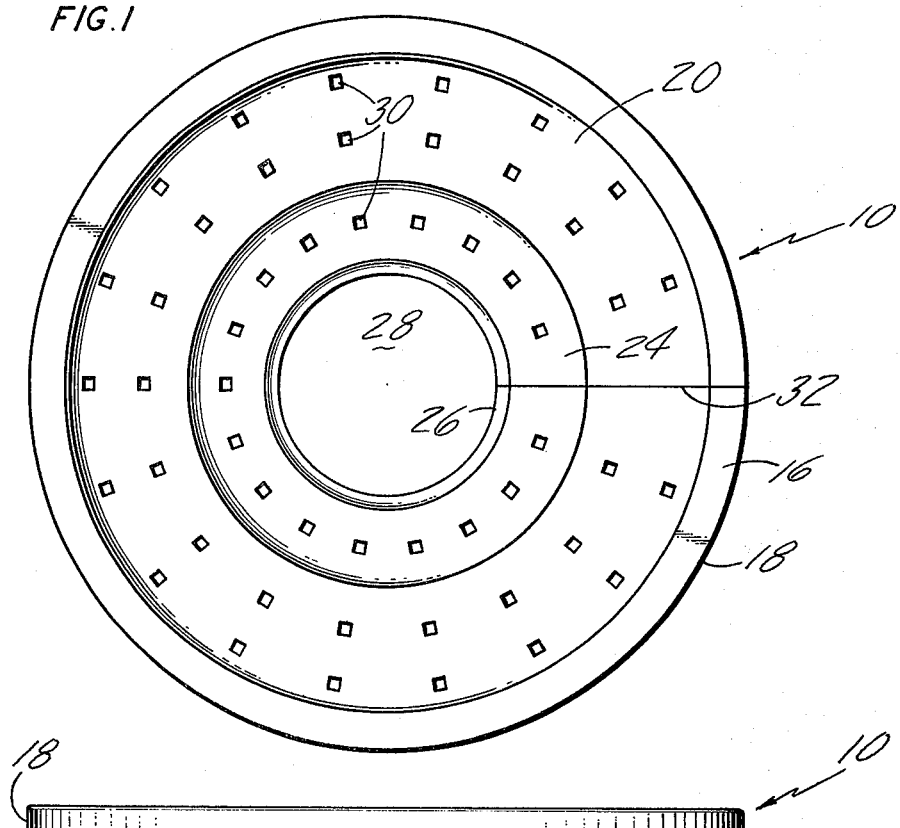
FIG. 1 is a top view of the pot cover of the present invention.
Figure 2:
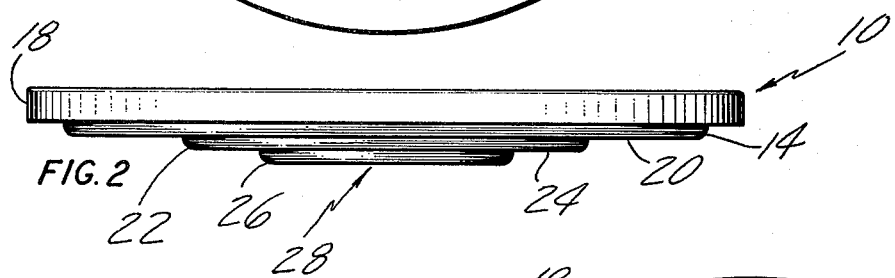
FIG. 2 is a front view of the pot cover of FIG. 1.
Figure 3:
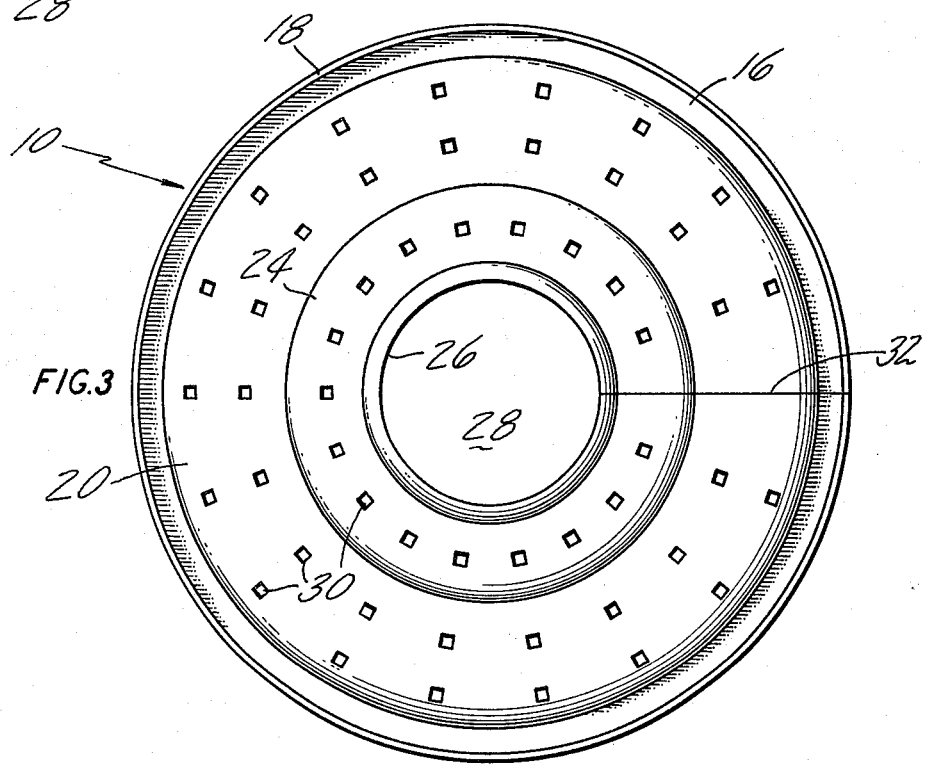
FIG. 3 is a bottom view of the pot cover of FIG. 1.
Figure 6:
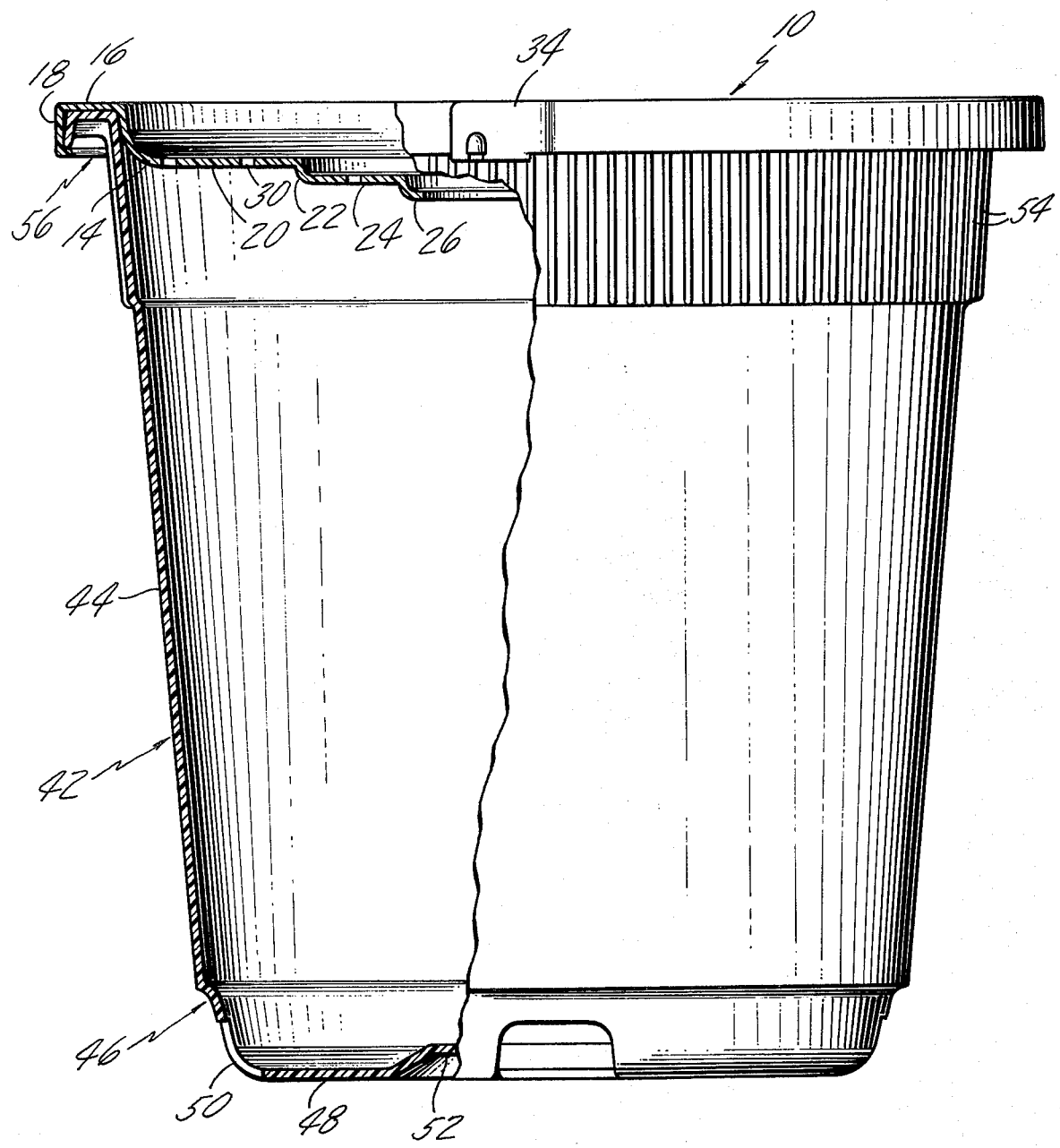
FIG. 6 is a view partially in cross section showing the pot cover secured to a nursery pot with the lock in the closed position.

The cover 10 is formed in one piece and has integrally attached thereto about its outside circumferential wall 14 a lip portion which includes a horizontal extension 16 and a vertical wall 18, the lip portion including extension 16 and wall 18 and the outside wall 14 forming an inverted U which permits the cover to fit snugly and securely over the top of a pot as shown more clearly in FIG. 6.

The wall 14 is curved downwardly and inwardly and terminates in a flat annular section 20. The inner circumference of the flat section 20 terminates in a downwardly extending and slightly sloped wall 22 from the lowest extent of which a second flat annular section 24 extends radially inward. At the inner circumference of flat section 24 there extends downwardly a lip portion 26 which is slightly curved and which terminates well short of the center of the cover to form a circular hole 28 through which the trunk or stem of the nursery stock protrudes when the cover 10 is attached to a nursery pot.

A plurality of cutouts or holes 30 are provided in the flat sections 20 and 24 through which water and/or nutrients may pass into the medium in the pot. The size, shape, number and position of the holes 30 are not critical as long as a sufficient number are provided through which water can pass, and as long as the number of holes does not detract from the relative rigidity of the cover 10. The slope of the walls 14 and 22 and the slope of lip 26 also assist in causing water from rain or from a sprinkler to pass through holes 30 or flow toward the center of the cover 10.

The circular lip 26 being the lowest part of the cover 10 will contact or dig into the medium when the pot is filled, and the outside curved portion of the lip 26 will serve to stabilize the plant contained in the pot from excessive lateral movement.

In order to permit the cover 10 to be positioned on a pot which contains stock without removing the stock, a radial slit 32 is provided which permits the flexible plastic to be separated and to pass around the base of the stock without damage thereto.

FIGS. 4 and 5 show a locking mechanism which will prevent opening or separation of the cover 10 along slit 32 when the cover is positioned securely on a pot. A short flexible tab member having a vertical face 34 and a short horizontal extension 36 at the bottom of vertical face 34 is integrally attached to the vertical wall 18 of the lip member at or adjacent slit 32. The tab member is preferably formed as an extension of the vertical wall 18, the entire cover including the flexible tab member being formed in one piece. A small hole 38 in vertical face 34 is adapted to expand over the enlarged head of knob 40 to lock the cover in place. Horizontal extension 36 fits under the bottom of vertical wall 18 when in the locked position as shown in FIG. 6 and stabilizes the locking mechanism by preventing rotation of the tab member about the axis of knob 40 when in the locked position.

The pot cover as described is particularly advantageous when used in conjunction with automatic watering systems since the plurality of holes tend to diffuse the water and disperse it evenly, thereby preventing erosion of the soil or medium in the pot during early stages of plant growth. The cover also tends to retard weed growth since the cover does not admit sufficient light for weeds to grow in the medium in the pot. A further advantage of the pot cover is that it retards excessive evaporation of water and permits the medium in the pot to breathe normally.

FIG. 6 shows the cover 10 secured to a nursery pot represented generally by reference numeral 42. While cover 10 can be adapted to numerous types of pots by minor changes in size or dimensions, the use of a pot as shown in FIG. 6 and as more specifically described and claimed in copending application Ser. No. 373,451 will be particularly advantageous in securing the benefits heretofore described. Briefly, nursery pot 42 is constructed from a plastic material similar to that of cover 10. The sidewalls 44 of pot 42 are slightly conical and terminate in a slightly indented reduced diameter shadow block and impact shelf 46 with the junction between the sidewall and the bottom 48 being curved to enhance movement of drainage water therethrough. A plurality of drainage holes 50, generally quadrilateral in shape and with rounded corners, are circumferentially spaced about the pot at the curved junction between the sidewall and the bottom, the holes extending partially up the side of the pot and a short distance along the bottom.

A raised dome 52 is formed in the bottom 48, the outer walls of the raised dome being sloped to enhanced the flow of irrigating water away from the center of the pot and toward the circumferentially located drainage holes 50. The bottom portion of the pot below the shadow block and shelf 46 is flexible to prevent splitting of the pot due to rough handling.

The top of the pot contains a plurality of circumferentially spaced vertical ribs 54 along the outside wall to stiffen the pot and to permit easy stacking of pots, the air spaces between the ribs permitting stacked pots to be separated easily.

A semi-rigid lip portion 56 extends circumferentially about the top edge of the pot, the lip portion being reinforced to enhance rigidity of the pot and handling thereof, particularly when the pot is lifted by the lip. The inside walls of the pot are smooth to provide proper drainage of irrigating water and to prevent spores from collecting.

The shadow block and impact shelf 46 acts as a shield to prevent the direct rays of the sun from striking the medium in the pot through the drainage holes 50 during the hottest portion of the day.

When used in combination with the cover 10, the container reduces the incidence of spore or fungus infection, enhances the drainage of irrigating water, and is both flexible and shock absorbent. The plastic material of the pot may be colored to reduce temperatures in the pot, to distinguish between different species of stock, and to enhance saleability. The combined pot and cover also permit growing, shipping and display of nursery stock without the necessity of balling, with reduced expense, with reduced damage from shipping and storage and without the shock incident from transplanting.

The combined pot and cover are especially adapted for use in intensive farms of the future where watering and feeding are performed automatically either outdoors or in an enclosed environmental structure.

While the present invention has been described in connection with a preferred embodiment thereof, it is apparent that changes may be made to the size, shape and construction without departing from the scope of the invention as hereinafter claimed.

I claim:

1. A cover for a nursery pot adapted to protect and support nursery stock contained therein and through which the stock can be fed and watered, comprising
    an annulus of thin, flexible plastic material having a centrally located circular aperture,
    the outside circumference of said annulus being curved smoothly upwardly to form a bounding wall which makes a slightly obtuse angle with said annulus,
    a rim portion comprising a horizontal wall extending radially outwardly a short distance from the topmost extension of said bounding wall, and including a vertical wall extending downwardly a short distance from the outermost extension of said horizontal wall, said rim portion forming with said bounding wall an inverted U which is adapted to fit snugly over the rim of a nursery pot,
    said annulus comprising a first flat annular portion lying in a plane extending radially inwardly from the bottom of said bounding wall toward said aperture and terminating short thereof, and a second flat annular portion extending radially inwardly from the inner circumference of said first annular portion, the outer circumference of said second annular portion being joined to the inner circumference of said first annular portion by a short substantially vertical curved wall, said second annular portion being in a plane slightly below the plane of said first annular portion,
    a short, curved lip extending downwardly and inwardly from the inner circumference of said second annular portion and terminating at the outer circumference of said aperture,
    a slit extending the entire radius of said cover and permitting the portions of said cover on either side of said slit to be slightly separated and allowing said cover to be mounted on or removed from a pot containing nursery stock,
    and a plurality of small holes in said first and second annular portions.

2. A cover as in claim 1 in which said small holes are rectangular and are circumferentially spaced about both said first and second annular portions.

3. A cover as in claim 1 and including a flexible tab movable between an open and a locked position, said tab having a vertical face portion attached at one end to the vertical wall which forms said rim portion at a location adjacent said slit,
    a knob member having an enlarged head portion extending radially outward from said vertical wall, said knob member being located adjacent said slit and on the opposite side of said slit from said tab,
    and an aperture located in the vertical face portion of said tab at a position which will engage said knob and cause said tab to be in a locked position.

4. A cover as in claim 3 and including a horizontal face portion attached to said vertical face portion and adapted to fit under said vertical wall when said tab is in its locked position.

5. In combination, an open topped plastic nursery pot of circular cross section having a substantially vertical sidewall which is tapered slightly from the top thereof so that the top of said pot is of slightly larger horizontal cross section than is the lower portion thereof,
    a flexible bottom portion of reduced diameter from the remainder of said pot, said bottom portion having a horizontally extending base member and a wall member joining said base member to the lowermost extension of said sidewall, said wall member being shaped so as to be concave with respect to the centerline of the pot adjacent said base member and convex with respect to the centerline of the pot adjacent said sidewall,
    a plurality of drainage holes circumferentially spaced about the bottom portion of said pot coextensive with the concave portion of said wall member,
    the center portion of said base member being slightly elevated and extending a short distance into the inside of said pot to form a circular dome which is joined to the radially outer portion of said base member by an outwardly sloping circumferential wall,
    a plastic cover for said pot having a rim portion forming an inverted U with the outer circumference of said cover and which is adapted to fit securely over the top of said pot,
    said cover comprising first and second flat planer annular portions, said second annular portion being spaced radially inward from said first annular portion with the outer circumference of said second annular portion being connected to the inner circumference of said first annular portion by a vertical wall whereby said second annular portion is in a plane lower than that of said first annular portion relative to the axis of said pot, a short, curved lip extending downwardly and inwardly from the inner circumference of said second annular portion, said lip forming the outer circumference of a centrally located aperture, a slit extending the entire radius of said cover and permitting the abutting portions of said cover opposite said slit to be separated, and a plurality of small holes in said first and second annular portions.

6. The combination as in claim 5 and further including means connected with the rim portion of said cover for securing together the portions of said cover on opposite sides of said slit.

* * * * *